United States Patent Office 3,466,712
Patented Sept. 16, 1969

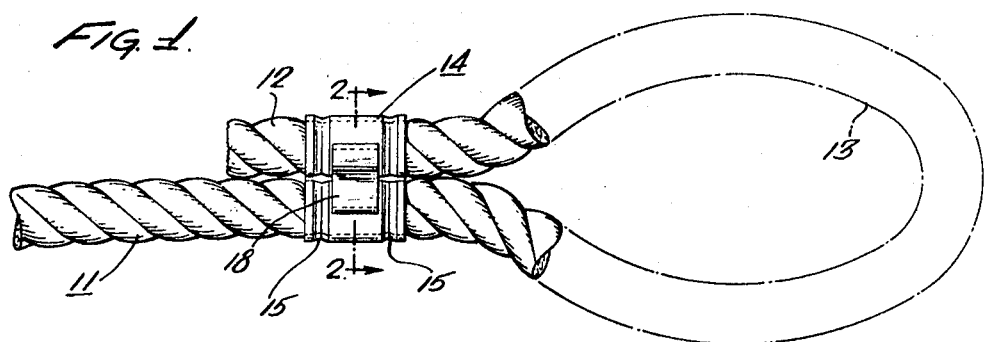
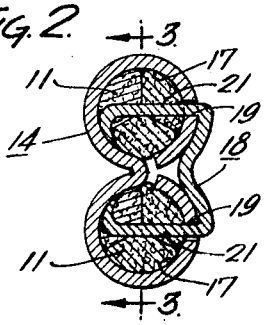
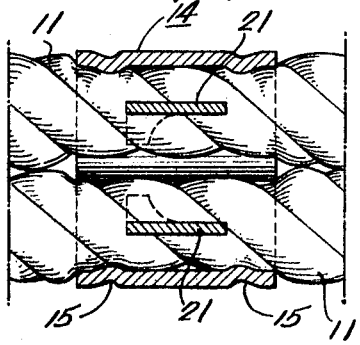
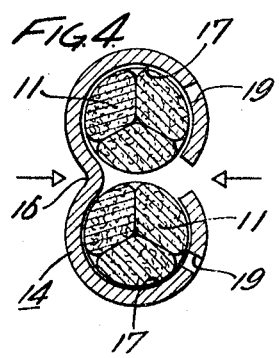
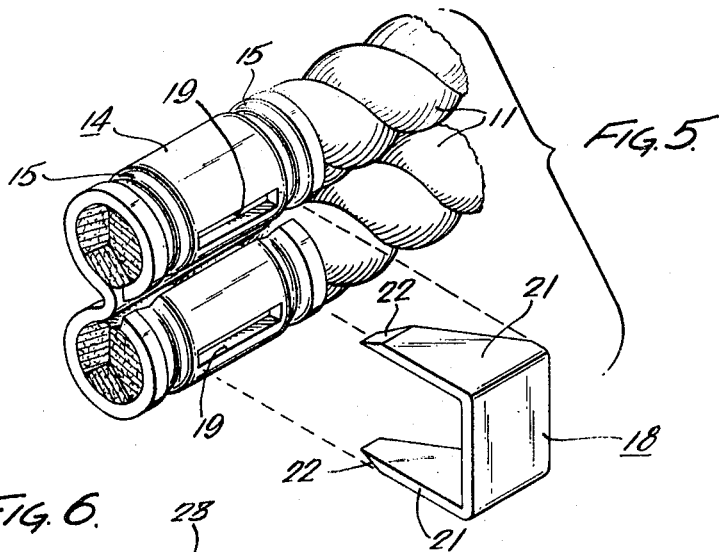
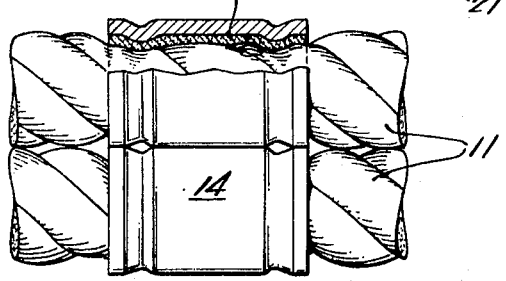

3,466,712
ROPE CLAMP
Robert J. Behney, 347 Hillside Road,
New Cumberland, Pa. 17070
Filed Nov. 28, 1967, Ser. No. 686,221
Int. Cl. F16g 11/00
U.S. Cl. 24—123                                              1 Claim

ABSTRACT OF THE DISCLOSURE

A clamp for forming a loop in the end of a rope in which the rope end is doubled back upon itself and the clamp is crimped about the doubled portion of the rope to hold the rope in loop form. The clamp separately encircles opposed segments of the rope at the end of the loop and is crimped about the opposed segments of the rope to securely grip the rope.

---

The present invention relates to new and useful improvements in rope clamps for forming a loop in an end of a rope and more particularly to new and useful improvements in a clamp which may be crimped about ends of a loop in a rope and securely grip or interlock with the rope.

A primary object of the present invention is to provide a rope clamp which may be secured to the rope to form a loop in the rope quicker and easier than handweaving or handsplicing of the rope and which forms a loop in the rope of high strength and good appearance.

Another object of the present invention is to provide a rope clamp for forming a loop in the rope which separately encircles and grips opposed segments of the loop of a rope to form a loop in the end of the rope which will withstand a high tensile force.

A further object of the present invention is to provide a novel rope clamp which may be quickly and easily attached to a rope with a relatively simple and inexpensive crimping tool.

A still further object of the present invention is to provide a novel rope clamp which is highly efficient and effective in use and which is relatively inexpensive and may be easily applied to a rope.

These and other objects of the present invention and the various features and details of the operation and construction thereof are hereinafter more fully set forth and described with reference to the accompanying drawings in which:

FIG. 1 is a plan view of an end of a length of rope secured in loop form with the rope clamp of the present invention;

FIG. 2 is an enlarged transverse sectional view taken along lines 2—2, FIG. 1;

FIG. 3 is an enlarged longitudinal sectional view through the rope clamp taken along lines 3—3, FIG. 2;

FIG. 4 is an enlarged transverse sectional view through the rope clamp with rope threaded through the clamp prior to the clamp being crimped about the rope;

FIG. 5 is a perspective view of the rope clamp of the present invention and a staple used to interlock the rope with the clamp; and FIG. 6 is a plan view partially in section illustrating a modified form of rope clamp of the present invention.

Referring more specifically to the drawings, in FIG. 1 there is shown a length of rope 11 having a terminal end portion 12 which is doubled back upon itself to form a loop 13 in the rope. The loop 13 is maintained in the rope by means of a clamp 14 made in accordance with the present invention which is tightly crimped about opposed segments of the rope 11 and terminal end portion 12 of the rope adjacent the loop 13. It will be understood that more than one clamp 14 may be provided spaced along the rope 11 and terminal end portion 12 of the rope to provide additional strength to the loop 13. However, for purposes of illustrating the present invention only one such clamp 14 has been shown.

The clamp 14 of the present invention is formed initially from a flat strip of metal. A primary application of the clamp 14 will be to form a loop in a line used in conjunction with boating and for this use, the clamp will preferably be formed of brass such as ¼ hard 70–30 brass. It has been found for example for ⅜" diameter rope a clamp formed of brass having a thickness of 0.05" is of sufficient strength to adequately hold the loop in the rope. For larger or smaller diameter ropes, the metal of the clamp may be of greater or lesser thickness. To increase the gripping force exerted on the rope by the clamp, there may be a regular pattern of indentations formed in the strip of metal from which the clamp is made. These indentations may take the form of inwardly extending beads 15 extending longitudinally the full length of the strip of metal from which the clamp 14 is formed.

With reference now to FIG. 4, to form the clamp 14 of the present invention the flat strip of metal is bent backwardly on itself at its midpoint at an obtuse angle as indicated at 16. The opposite end portions of the strip are then bent upwardly away from each other and forwardly into generally circular form from the center bend 16 with the extreme opposite ends terminating in spaced relation from one another and spaced from the center bend 16 to the general shape as shown in FIG. 4. In this form of the clamp 14, there is a longitudinal opening extending through the clamp having at the top and bottom of the clamp generally circular sections 17, 17 which connect with one another at the midpoint of the clamp.

In accordance with the present invention, the two circular sections 17, 17 of the central opening of the clamp are larger in diameter than the diameter of the rope to which the clamp is to be applied. To utilize this clamp to form a loop 13 in a rope, the free end of the rope is first threaded through one circular section 17 of the opening, is doubled back upon itself to form the loop and is then threaded in the opposite direction through the upper circular section of the opening. If more than one clamp is desired on the rope, the rope end is threaded through both of the clamps at the same time and the clamps are spaced at the desired locations relative to the rope end.

The clamp with the rope threaded through it is then placed between the jaws of a conventional crimping device and the clamp is crimped tightly about the rope. The jaws of the crimping device will engage opposite sides of the clamp and squeeze the sides of the clamp together under pressure in the direction indicated by the arrows in FIG. 4. As a result of this crimping pressure exerted on the clamp, the clamp will substantially completely encircle the two separate portions of the looped end of the rope for example as shown in FIGS. 2 and 5 and will tightly grip the engaged portions of the rope. Longitudinal movement of the two engaged portions of the rope relative to one another and to the clamp is prevented by friction of the clamp on the loop due to the force the crimped clamp exerts on the rope. Additionally, the indentations 15 will be impressed into the surface of the rope further increasing the holding force of the clamp.

This clamp as described above when tightly crimped about the rope will form a permanent loop in the end of the rope with sufficient holding strength to withstand any normal tension force applied to the rope.

In many instances, it may be desirable to further increase the gripping force of the clamp on the rope. In FIGS. 1 through 5, inclusive, of the drawings, there is illustrated one method for increasing the gripping force of the clamp upon the rope. In this embodiment of the present invention, a staple 18 is inserted through slots 19, 19 in the clamp and through the segments of the rope gripped by the clamp to physically interlock the rope and the clamp and to aid in maintaining the clamp tightly locked about the segments of the rope. The staple 18 has a central base portion 20 and two parallel leg portions 21, 21 which are inserted through the slots 19, 19 in the clamp. Preferably, the slots 19, 19 in the clamp are parallel to one another and extend through the material of the clamp adjacent the ends of the strip from which the clamp is formed. The slots are so positioned that in the crimped clamp the staple legs pass through the center of the segments of rope contained by the clamp. The legs 21, 21 of the staple are of greater length than the diameter of the rope and are beveled as indicated at 22, 22 at their outer end portions so that when the staple is inserted through the rope, the ends of the leg portions of the staple will engage the walls of the clamp opposite the slots 19, 19 in the clamp and turn under and rearwardly upon themselves as illustrated in FIG. 2.

The staple may be inserted into the clamp and through the rope after the clamp is crimped in any convenient manner. One easy method of inserting the staple is to position the staple in the clamp with the forward ends of the legs of the staple extending through the slots 19, 19 of the clamp, then reinserting the clamp and staple in the crimping machine which initially crimps the clamp and using the jaws of the crimping machine to force the staple through the rope. By the use of the staple 19 along with the clamp 14 the rops is physically interlocked with the clamp and the holding force of the clamp on the rope is greatly increased.

In another form of the present invention, the inner surface of the clamp may be lined with a relatively soft material as illustrated at 23 in FIG. 6 which will deform under the crimping pressure when the clamp is crimped about the rope and conform to irregularities in shape of the outer surface of the rope to again physically interlock the clamp and increase the friction between the rope and the clamp. The material as shown at 23 in FIG. 6 may, for example, be lead or alternatively may be rubber or soft plastic material bonded to the inner surface of the clamp. Further, this material as shown at 23 in FIG. 6 may be any suitable adhesive material which will bond to both the inner surface of the clamp and the segments of rope contained by the clamp to cause the rope to adhere to the clamp and further increase resistance to movement of the rope relative to the clamp.

While particular embodiments of the present invention have been illustrated and described herein changes and modifications may be incorporated and embodied therein.

I claim:

1. A clamp for securing two segments of rope in parallel side by side relationship comprising, a rigid integral strip of material bent at its midpoint at an angle extending in one direction, the strip of material adjacent opposite sides of the midpoint bend being bent away from one another and extending from said midpoint bend in a circular path in a direction opposite the direction of the midpoint bend, the opposite free ends of the strip terminating adjacent each other and adjacent the midpoint bend forming in the clamp two separate generally circular openings extending through the clamp in a direction longitudinally of the clamp, one of each of said rope segments extending through each of said openings, said clamp being securely crimped about said rope segments, at least one indentation in said strip projecting inwardly into each said openings to engage and interlock with the rope within said openings, means defining a slot in each end of said strip of material communicating with the opening in said clamp formed by each said end, and a staple member having two leg portions with a leg portion extending through each slot and through the rope segment contained in the longitudinal opening in communication with each slot to lock the rope and the clamp together.

References Cited

UNITED STATES PATENTS

| | | | |
|---|---|---|---|
| 561,438 | 6/1896 | Robertson | 287—78 |
| 574,234 | 12/1896 | Barnes. | |
| 643,238 | 2/1900 | Saeger. | |
| 1,079,881 | 11/1913 | Reagles. | |
| 1,206,008 | 11/1916 | McCabe. | |
| 1,628,278 | 5/1927 | Scheuer. | |
| 2,149,209 | 2/1939 | Dickie. | |

BERNARD A. GELAK, Primary Examiner

U.S. Cl. X.R.

339—99, 276